United States Patent
Park et al.

(10) Patent No.: US 11,493,421 B2
(45) Date of Patent: Nov. 8, 2022

(54) DEVICE FOR MEASURING FINE DUST AND FINE DUST INFORMATION UTILIZATION SYSTEM COMPRISING SAME

(71) Applicant: LG Electronics Inc., Seoul (KR)

(72) Inventors: Chiwan Park, Seoul (KR); Kwanghee Kang, Seoul (KR); Guedong Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/627,211

(22) PCT Filed: Dec. 29, 2017

(86) PCT No.: PCT/KR2017/015746
§ 371 (c)(1),
(2) Date: Dec. 27, 2019

(87) PCT Pub. No.: WO2019/132079
PCT Pub. Date: Jul. 4, 2019

(65) Prior Publication Data
US 2020/0319074 A1    Oct. 8, 2020

(51) Int. Cl.
*H04L 12/24* (2006.01)
*H04L 41/0803* (2022.01)
(Continued)

(52) U.S. Cl.
CPC ............ *G01N 15/02* (2013.01); *H04W 4/027* (2013.01); *H04W 4/38* (2018.02)

(58) Field of Classification Search
CPC ........ G01N 15/02; H04W 4/38; H04W 4/027; H04W 4/02; Y02D 30/70; H04L 29/08; H04L 67/125
(Continued)

(56) References Cited

U.S. PATENT DOCUMENTS

2012/0173293 A1* 7/2012 Motley .................. G06Q 10/06
                                                        705/7.11
2013/0309154 A1* 11/2013 Call ........................ G08B 21/12
                                                        423/210
(Continued)

FOREIGN PATENT DOCUMENTS

JP    WO2015181950    4/2017
KR    101048267       7/2011
(Continued)

OTHER PUBLICATIONS

Extended European Search Report in European Appln No. 17936795.8, dated Nov. 29, 2021, 9 pages.
(Continued)

*Primary Examiner* — Yves Dalencourt
*Assistant Examiner* — Elizabeth Kassa
(74) *Attorney, Agent, or Firm* — Fish & Richardson P.C.

(57) ABSTRACT

Disclosed are particulate matter measuring device and a particulate matter information utilizing system, the particulate matter measuring device including: a particulate matter concentration measuring sensor configured to measure particulate matter concentration information; a location sensing module configured to select location information of a place where the particulate matter concentration information is measured by the particulate matter concentration measuring sensor; a communication module configured to communicate with an electronic device; and a control module configured to output a control signal to control the electronic device, based on the particulate matter concentration information and location information corresponding to the particulate matter concentration information.

14 Claims, 15 Drawing Sheets

(51) Int. Cl.
  *G01N 15/02* (2006.01)
  *H04W 4/38* (2018.01)
  *H04W 4/02* (2018.01)

(58) Field of Classification Search
  USPC ........................................................ 356/336
  See application file for complete search history.

(56) References Cited

U.S. PATENT DOCUMENTS

| | | | |
|---|---|---|---|
| 2014/0207282 A1* | 7/2014 | Angle | G05B 15/02 |
| | | | 700/257 |
| 2015/0142169 A1* | 5/2015 | Kim | A47L 11/282 |
| | | | 15/98 |
| 2016/0135655 A1* | 5/2016 | Ahn | G05D 1/0044 |
| | | | 15/319 |
| 2016/0259341 A1* | 9/2016 | High | H04W 4/40 |
| 2017/0008162 A1* | 1/2017 | Tsubota | G05B 19/00 |
| 2018/0074508 A1* | 3/2018 | Kleiner | G05D 1/0219 |
| 2018/0263449 A1* | 9/2018 | Rosskopf | A47L 9/2852 |
| 2018/0266933 A1* | 9/2018 | Tamraz | G01N 15/06 |
| 2020/0103328 A1* | 4/2020 | Ozcan | G01N 15/0227 |
| 2020/0272168 A1* | 8/2020 | Send | G05D 1/0274 |

FOREIGN PATENT DOCUMENTS

| | | |
|---|---|---|
| KR | 20120128199 | 11/2012 |
| KR | 20150117467 | 10/2015 |
| KR | 20160037046 | 4/2016 |
| KR | 1020170009180 | 1/2017 |
| KR | 20170121858 | 11/2017 |
| WO | WO2016048049 | 3/2016 |
| WO | WO-2021029918 A1 * | 2/2021 ........... A47L 11/4011 |

OTHER PUBLICATIONS

International Search Report in International Appln. No. PCT/KR2017/015746, dated Oct. 25, 2021, 5 pages (with English translation).
Office Action in Korean Appln. No. 10-2020-7012863, dated Sep. 14, 2021, 10 pages (with English translation).

* cited by examiner

DEVICE FOR MEASURING FINE DUST AND FINE DUST INFORMATION UTILIZATION SYSTEM COMPRISING SAME

CROSS-REFERENCE TO RELATED APPLICATIONS

This application is a National Stage application under 35 U.S.C. § 371 of International Application No. PCT/KR2017/015746, filed on Dec. 29, 2017, the disclosures of which is incorporated by reference in its entirety.

TECHNICAL FIELD

The present invention relates to a particulate matter measuring device, and a particulate matter information utilizing system including the same.

BACKGROUND ART

Particulate matters, toxic gas, pollutants, and the like float not just in an indoor space but also in an outdoor space, for example, a house, an office, and public use facilities used by unspecified multiple users, and these harmful matters are air pollutants which can causes deadly respiratory diseases, communicable diseases, and the like.

Such air pollutants include toxic gas and contaminants, such as particulate matters equal to or less than 10 µm in diameter, ultrafine particles equal to less than 2.5 µm in diameter, Volatile Organic Compounds (VOC), carbon oxide, formaldehyde, nitrogen dioxide (NO2), sulfur dioxide (SO2), ozone (O3), carbon dioxide (CO2), etc.

In particular, particulate matters and ultrafine particles, which are composed of ion components such as nitrate, ammonium, sulfate, etc., carbon compounds, metal compounds, and the like, are considered harmful pollutants the most harmful to human health, in association with black carbon from diesel, which is classified as group 1 carcinogen by the WHO. In particular, long-term exposure to particulate matters may dramatically deteriorate a human's immune system and thereby cause not just respiratory diseases such as cold, asthma, bronchitis, etc., but also various other diseases such as cardiovascular diseases, skin disease, eye diseases, etc., and ultrafine particles equal to or less than 2.5 µm in diameter can easily go deep inside bronchus and lung and stick thereto, causing various diseases. For this reason, the Ministry of Environment in South Korea has started to enforce regulations for particulate matters (PM 10) equal to or less than 10 µm in diameter since 1995 and has started to enforce regulations for ultrafine particles equal to or less than 2.5 µm in diameter since 1025.

In addition, as "Indoor Air Quality Control in Pubic Use Facilities" was established in 2003 to control air quality of public use facilities used by multiple unspecified users, e the range and targets for regulate indoor air quality to be clean have been widened and extended.

An air purifier for suctioning dust and pollutants to improve air quality, an air conditioner for controlling temperature, a dehumidifier (humidifier) for controlling humidity, and the like are widely used as devices for improving indoor air quality, yet, since a user is allowed to check individual state measurements of these home appliances and operate or stop the home appliances individually, it is difficult to easily recognize the air quality by accounting all of the particulate matters, the temperature, the humidity, etc., and thus, an air quality control such as ventilation cannot be performed at a proper time even when the indoor air quality is at a level harmful to human health, and also the air quality control devices may be left in operation even when the air quality is decent enough, thereby causing power consumption. A conventional portable particulate matter measuring device is able to measure only a particulate matter concentration, but uncapable of utilizing measured particulate matter concentration information and providing a user with various services based on the particulate matter concentration information.

DISCLOSURE

Technical Problem

An objective of the present invention is to provide a user with particulate matter concentration information measured by a particulate matter measuring device, particulate matter map which can be intuitively recognized by a user, and map information all together.

Another objective of the present invention is to provide a user with particulate matter concentration information measured by a particulate matter measuring device and a clean air route passing through a low particulate matter concentration area to a destination, based on location information.

Yet another objective of the present invention is to control an electronic device based on particulate matter concentration information measured by a particulate matter measuring device and location information, thereby saving energy and providing a user with an indoor environment with good air quality.

Objectives of the present invention should not be limited to the aforementioned objects and other unmentioned objects will be clearly understood by those skilled in the art from the following description.

Technical Solution

In order to achieve the above objectives, the present invention provides a particulate matter measuring device and a particulate matter information utilizing system, the particulate matter measuring device including: a particulate matter concentration measuring sensor configured to measure particulate matter concentration information; a location sensing module configured to select location information of a place where the particulate matter concentration information is measured by the particulate matter concentration measuring sensor; a communication module configured to communicate with an electronic device; and a control module configured to output a control signal to control the electronic device, based on the particulate matter concentration information and location information corresponding to the particulate matter concentration information.

The details of other embodiments are included in the following description and the accompanying drawings.

Advantageous Effects

The particulate matter measuring device of the present invention and the particulate matter information utilizing system including the same may have one or more effects as below.

First, as a portable particulate matter measuring device collects location information together with particulate matter concentration information and provide the collected data to an electronic device, there is an advantage that an electronic device can be controlled precisely based on the particulate matter concentration and the location information.

Second, as particulate matter information is provided based on the particulate matter concentration information and the location information together with map information, there is an advantage that a user is allowed to easily recognize the particulate matter information through the map information.

Third, as a clean air route passing through a low particulate matter concentration area is provided to the user based on the particulate matter concentration information and the location information, there is an advantage that the user is prevented from exposure to particulate matters while driving or taking a walk.

Fourth, there is an advantage that a plurality of particulate matter measuring devices can collect particulate matter concentration information at various locations and the matter concentration information collected at various locations can be shared by a plurality of users via a server and utilized to control an electronic device.

Fifth, when multiple users having been exposed to particulate matters for a predetermined period of time comes inside a space in which an electronic device is located, a priority of air discharged from an air purifier is given to a user having been exposed to high concentration of particulate matters, based on each user's average particulate matter concentration, and therefore, there is an advantage that particulate matters can be removed efficiently.

Effects of the present invention should not be limited to the aforementioned effects and other unmentioned effects will be clearly understood by those skilled in the art from the claims.

BEST MODE

Figure 1:
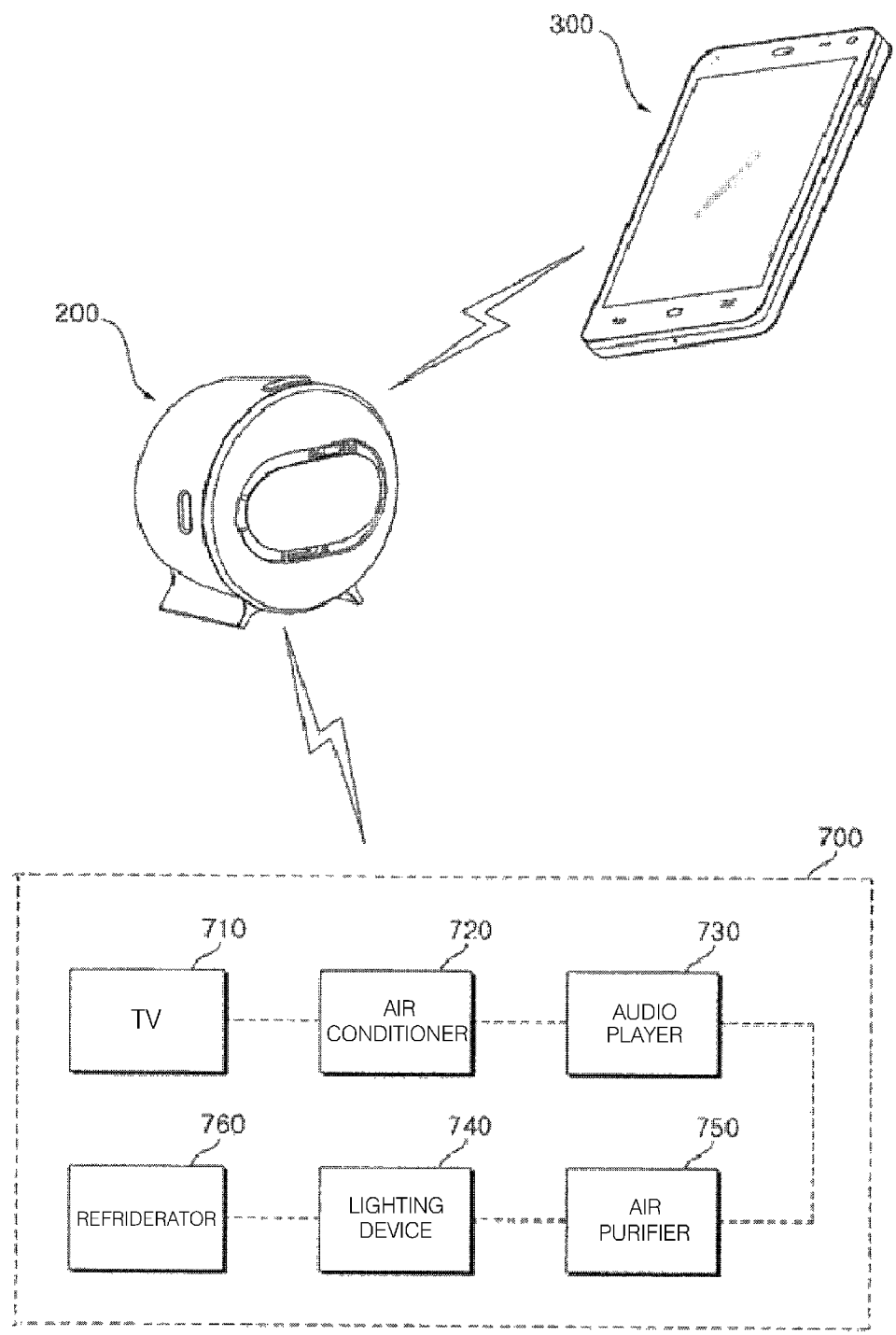
FIG. 1 is a conceptual diagram of a particulate matter information utilizing system according to an embodiment of the present invention.

Advantages and features of the present invention and a method of achieving the same will be clearly understood from embodiments described below in detail with reference to the accompanying drawings. However, the present invention is not limited to the following embodiments and may be implemented in various different forms. The embodiments are provided merely for complete disclosure of the present invention and to fully convey the scope of the invention to those of ordinary skill in the art to which the present invention pertains. The present invention is defined only by the scope of the claims. In the drawings, the thickness of layers and regions may be exaggerated for clarity. Throughout the drawings, like numbers refer to like elements.

Spatially-relative terms such as "below", "beneath", "lower", "above" or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

Terms used in this specification are to describe exemplary embodiments and are not intended to limit the present invention. In this specification, singular forms used include a plurality of forms unless phrases explicitly represent an opposite meaning. A meaning of "comprises" and/or "comprising" used in a specification does not exclude the presence or addition of at least one of other constituent elements.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

In the drawings, anything unnecessary for describing the present invention will be omitted for clarity, and also like reference numerals in the drawings denote like elements.

In addition, angles or directions used to describe the structures of the present invention are based on those shown in the drawings. Unless a reference point of an angle or angular positional relations in the structures of the present invention are clearly described, the related drawings may be referred to.

Hereinafter, an embodiment of the present invention will be described in detail with reference to the accompanying drawings.

FIG. 1 is a conceptual diagram of a particulate matter information utilizing system according to an embodiment of the present invention.

Referring to FIG. 1, a particulate matter information utilizing system according to an embodiment of the present invention includes a plurality of electronic devices, and a particulate matter measuring device 200 connected to the plurality of electronic devices by wired/wireless communication methods. Of course, the electronic devices may include a mobile terminal 300 connected to a different electronic device and/or the particulate matter measuring device 200 by a wired communication method.

The plurality of electronic devices comprises electronic devices commonly used at home. For example, the plurality of electronic devices may include at least one of a TV 710, an air conditioner 720, an audio player 730, a refrigerator 760, a lighting device 740, an air purifier 750, the mobile terminal 300, or a cooking appliance. However, the types of the electronic devices are not limited thereto.

The mobile terminal 300 may be a portable device. However, aspects of the present invention are not limited thereto, and the mobile terminal 300 may be any device capable of performing communication with the particulate matter measuring device 200 and/or an electronic device and performing a control operation, and a type of the mobile terminal 300 is not limited.

The particulate matter measuring device 200 may perform communication with the mobile terminal 300 and/or an electronic device, collect concentration information and location information regarding particulate matters, and control the electronic device in accordance with a user's control command.

In the present invention, a server 10 for storing concentration information and location information regarding particulate matters may be further included. The server 10 is connected to an electronic device and/or the particulate matter measuring device 200 through wired or wireless communication methods.

Figure 2:
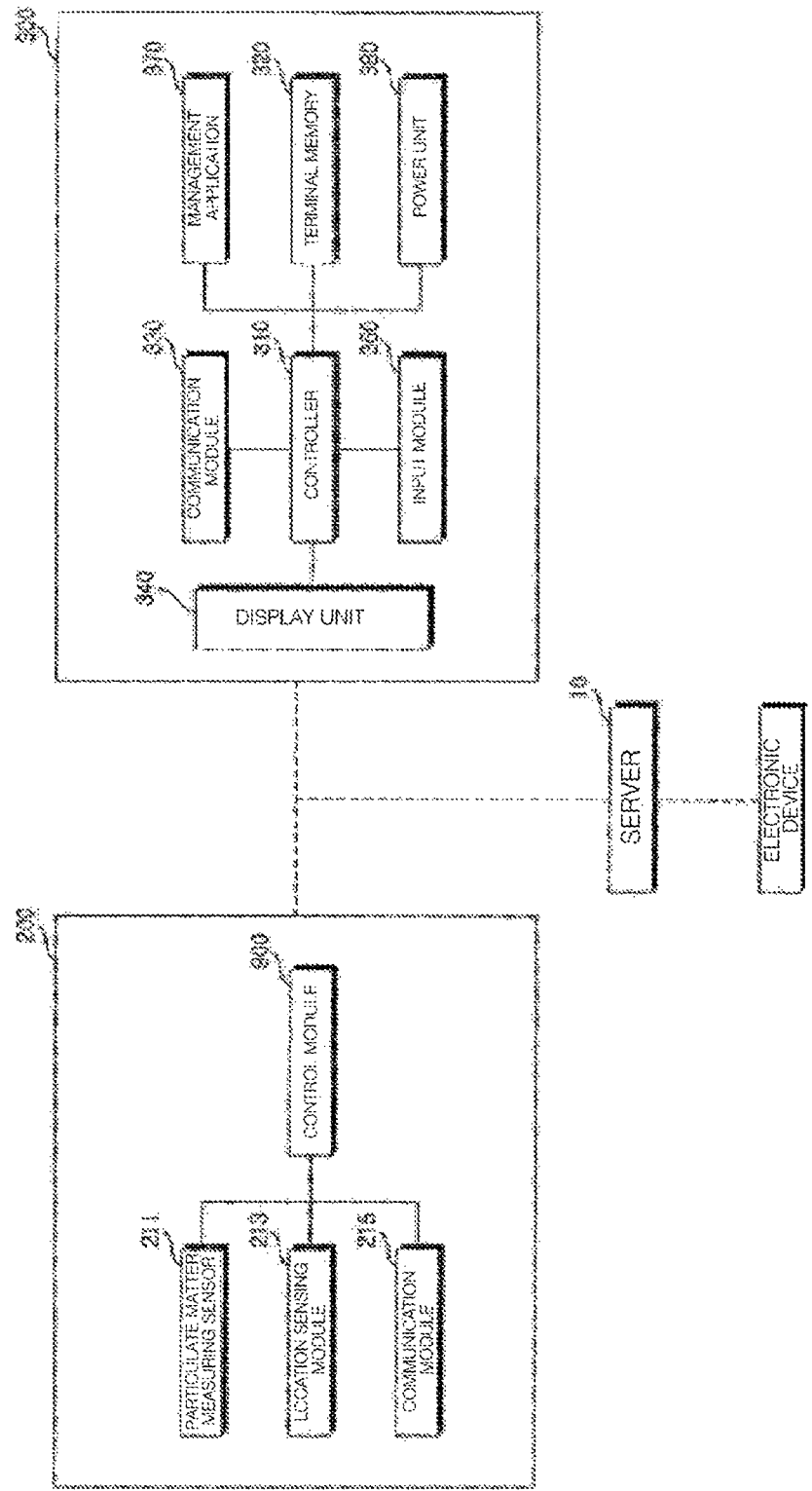
FIG. 2 is a block diagram of a particulate matter information utilizing system according to an embodiment of the present invention.

FIG. 2 is a block diagram illustrating a particulate matter information utilizing system according to an embodiment of the present invention.

The particulate matter measuring device 200 of the present invention may include a particulate matter concentration measuring sensor 211 for measuring particulate matter concentration information, a location sensing module 213 for collecting location information of a place where the particulate matter concentration information is measured by the particulate matter concentration measuring sensor 211, a communication module 215 for communicating with an electronic device, and a control module 900 for outputting a control signal to control the electronic device based on the particulate matter concentration information and the location information corresponding to the particulate matter concentration information.

The communication module 215 enables transmission and reception of data between an electronic device and the particulate matter measuring device 200. The communication module 215 transmits received data to the control module 900, and transmits a control signal, received from the control module 900, to an electronic device to be controlled. In addition, the communication module 215 transmits, to the serer 10, the particulate matter concentration information measured by the particulate matter concentration measuring sensor 211 and the location information collected by the location sensing module 213.

The communication module 215 may utilize short-ranged communication technologies, such as Bluetooth, Radio Frequency Identification (RFID), infrared Data Association (IrDA), Ultra Wideband (UWB), Zigbee, and the like, as well as wireless Internet communication such as Wireless LAN (WLAN) (Wi-Fi), Wireless broadband (Wibro), World Interoperability for Microwave Access (Wimax), (High Speed Downlink Packet Access (HSDPA), WiFi, and the like, and thus, the communication module is not limited to a specific communication method.

The particulate matter concentration measuring sensor 211 measures a particulate matter concentration in the surroundings, and provide the measured particulate matter concentration to the control module 900. Of course, in another embodiment, if the particulate matter measuring device 200 includes an additional memory, the particulate matter concentration information collected by the particulate matter concentration measuring sensor 211 may be stored in the memory.

For example, the particulate matter concentration measuring sensor 211 may include an optical sensor that outputs light and measures a concentration of particulate matters in the air on the basis of a degree by which brightness of the light is reduced.

The location sensing module 213 collects location information of a place where the particulate matter concentration information is measured by the particulate matter concentration measuring sensor 211, and provides the location information to the control module 900. That is, the location sensing module 213 may collect location information of the particulate matter measuring device 200. Specifically, when the particulate matter concentration measuring sensor 211 measures a particulate matter concentration, the location sensing module 213 may collect location information of the particulate matter measuring device 200 together.

Although the particulate matter measuring device 200 in the present embodiment includes the location sensing module 213 for collecting location information, another embodiment may be implemented with a configuration in which the location sensing module 213 is omitted to reduce the volume of the particulate matter measuring device 200. In cases where the location sensing module 213 is omitted from the particulate matter measuring device 200, location information of the mobile terminal 300 paired with the particulate matter measuring device 200 is utilized.

For example, the location sensing module 213 may include a Global Position System (GPS) module.

The GPS module receives a signal including time information from at least three navigation satellites, and calculate a distance to each of the satellite on the basis of the signal. The location information may be obtained by applying triangulation to the calculated distance. The GPS module may further apply a technique, such as map matching and dead reckoning, to the location information, obtained by applying the triangulation, to thereby improve precision of the calculated location information.

Of course, if the location sensing module 213 is provided in the mobile terminal 300, not just the GPS module but also other various technologies such as Cell tower signals, wireless Internet signals, a Bluetooth sensor, and the like may be used together to obtain location information to find a location of the mobile terminal 300. This type of technology is referred to as a hybrid positioning system.

The particulate matter measuring device 200 may be fixed at a predetermined position or may be carried around by a user. The particulate matter measuring device 200 may have a structure including a power unit such as an additional batter or may have a structure not including an additional power unit but connected to an external power source via a cable or the like.

The control module 900 outputs a control signal to control an electronic device, based on particulate matter concentration information and location information corresponding to the particulate matter concentration information. Accordingly, the present invention intuitively is capable of providing a user with particulate matter information based on particulate matter concentration information and location information corresponding to the particulate matter concentration information, and capable of efficiently controlling an electronic device. Detailed control operations of the control module 900 will be described later on.

Although the present embodiment is described that the control module 900 is included in the particulate matter measuring device 200, the control modules 900 in some embodiments may be provided in the mobile terminal 300, the server 10, or any other electronic device.

Hereinafter, the structure of the mobile terminal 300 will be described as an example of an electronic device.

Hereinafter, for convenience of explanation, a bar-type portable device having a front touch screen from among various types of portable devices, such as a folder type, a bar type, a swing type, a slider type, and the like, will be described as the mobile terminal 300. However, the present invention is not limited to the bar-type portable device and the mobile terminal 300 may include all types of portable device, including the aforementioned types.

For example, the mobile terminal 300 may include a display unit 340 for realizing an image, a communication module 330 capable of communicating with a different electronic device 700 and/or the particulate matter measuring device 200, a user input unit 360 for inputting a user's control command, a controller 310 for generating a control signal to control the mobile terminal 300 and the particulate matter measuring device 200, and a memory 280 for storing information data.

Of course, the present embodiment is described that the mobile terminal 300 is provided with the controller 310 and the particulate matter measuring device 200 is provided with the control module 900, but, in the following other embodiments, the mobile terminal 300 may be provided with the control module 900 and the particulate matter measuring device 200 may be provided without the control module 900 and the particulate matter measuring device 200 may be controlled by a control signal from the control module 900 of the mobile terminal 300.

In addition, the mobile terminal 300 may operate by a power supply from a power unit 280. A user may execute a management application 370 stored in the memory 280 of the mobile terminal 300 so as to control the different electronic device 700 or the particulate matter measuring device 200. The user may access the Internet through the mobile terminal 300, download and install the management application 370, and execute the management application to control the particulate matter measuring device 200 or the electronic device 700.

The display unit 340 is a device for outputting an image that can be visually recognized by the user.

The display unit 340 may display information processed by the control module 900 in a form of visual information that can be recognized by the user.

For example, the display unit 340 may display control information for controlling a different electronic device and/or the particulate matter measuring device 200. The display unit 340 may display state information of a different electronic device and/or the particulate matter measuring device 200. A remote object for controlling a different electronic device and/or the particulate matter measuring device 200 may be output on the display unit 340. Particulate matter concentration information, location information corresponding to the particulate matter concentration information, and map information are displayed on the display unit 340.

In some embodiments, the display unit 340 may include a touch panel for sensing a touch and thus sense a touch input. When including the touch panel, the display unit 340 may be used as an input device through which a control command can be input by a user's touch.

For example, the display unit 340 may include at least one of a liquid crystal display, a thin film transistor-liquid crystal display, an organic light-emitting diode, a flexible display, or a 3D display.

Specifically, in a case where a user interface (UI) screen for displaying information of the electronic device 700 and control information of the electronic device is implemented by the management application 370 and a touch panel is used, a remote object for receiving a user's control command may be displayed on the display unit 340. The remote object receives a control command in accordance with the user's touch and outputs the control command to the controller 310 or the control module 900.

The user input unit 360 may receive the user's control command. The user's control command may be generated as a control signal by the controller 310 or the control module 900.

For example, the user input unit 360 may include the touch panel provided in the display unit 340.

The communication module 330 of the mobile terminal 300 may communicate with a communication module 330 of the particulate matter measuring device 200 and/or the different electronic device 700.

The terminal memory 280 may include a high-speed random access memory. The terminal memory 280 may include, but not limited to, one or more non-volatile memories such as magnet disk storage devices, flash memory devices, or non-volatile virtual memories, and may include a readable storage medium. For example, the terminal memory 280 may include, but not limited to, an Electronically Erasable and Programmable Read Only Memory (EEP-ROM). The EEP-ROM may write or delete information by the controller 310 or, during operation of the control module 900, by the controller 310 or the control module 900. The EEP-ROM may be a storage device capable of maintaining information stored therein even when supplying power stops due to power-off of a control device.

The terminal memory 280 may store a diversity of programs, data, or the like in conjunction with the controller 310 or the control module 900. The terminal memory 280 may store a program necessary for the controller 310 or the control module 900 to control the electronic device or the particulate matter measuring device 200.

The terminal memory 280 may store operation information regarding a method for operating the electronic device. In addition, the terminal memory 280 may store history information regarding a method by which the electronic device has been controlled based on a control command from an input module 260.

In addition, the terminal memory 280 may store map information, matching information, color change information, etc.

wherein the matching information is for matching the map information, location information of the particulate matter measuring device 200, and particulate matter concentration information, and the color change information is for changing to any of various colors depending on a particulate matter concentration.

Hereinafter, a method for controlling various home appliances based on particulate matter concentration information and location information will be described.

The control module 900 outputs a control signal for controlling the particulate matter concentration measuring sensor 211 and the location sensing module 213 in order to collect particulate matter concentration information and location information at intervals of a preset unit time. Specifically, the particulate matter concentration measuring sensor 211 and the location sensing module 213 measures location information and particulate matter concentration information, corresponding to the location information, at intervals of 30 minutes to 2 hours.

The control module 900 may store, in an internal memory, particulate matter concentration information and location information measured at an equal time, among all the particulate matter concentration information and the location information provided from the particulate matter concentration measuring sensor 211 and the location sensing module 213, as link data or may transmit the same to the server.

In another example, the control module 900 may transmit particulate matter concentration information and location information to the electronic device and the mobile terminal 300. In this case, the particulate matter concentration information and the location information may be stored in the terminal memory 280 of the mobile terminal 300.

The particulate matter concentration information and the location information transmitted to the electronic device may be delivered to a user in various ways. For example, the control module 900 may output a control signal to display the particulate matter concentration information and the location information through a TV or to output the same as a voice through an audio player. By such a control signal, the electronic device is controlled.

Figure 3:
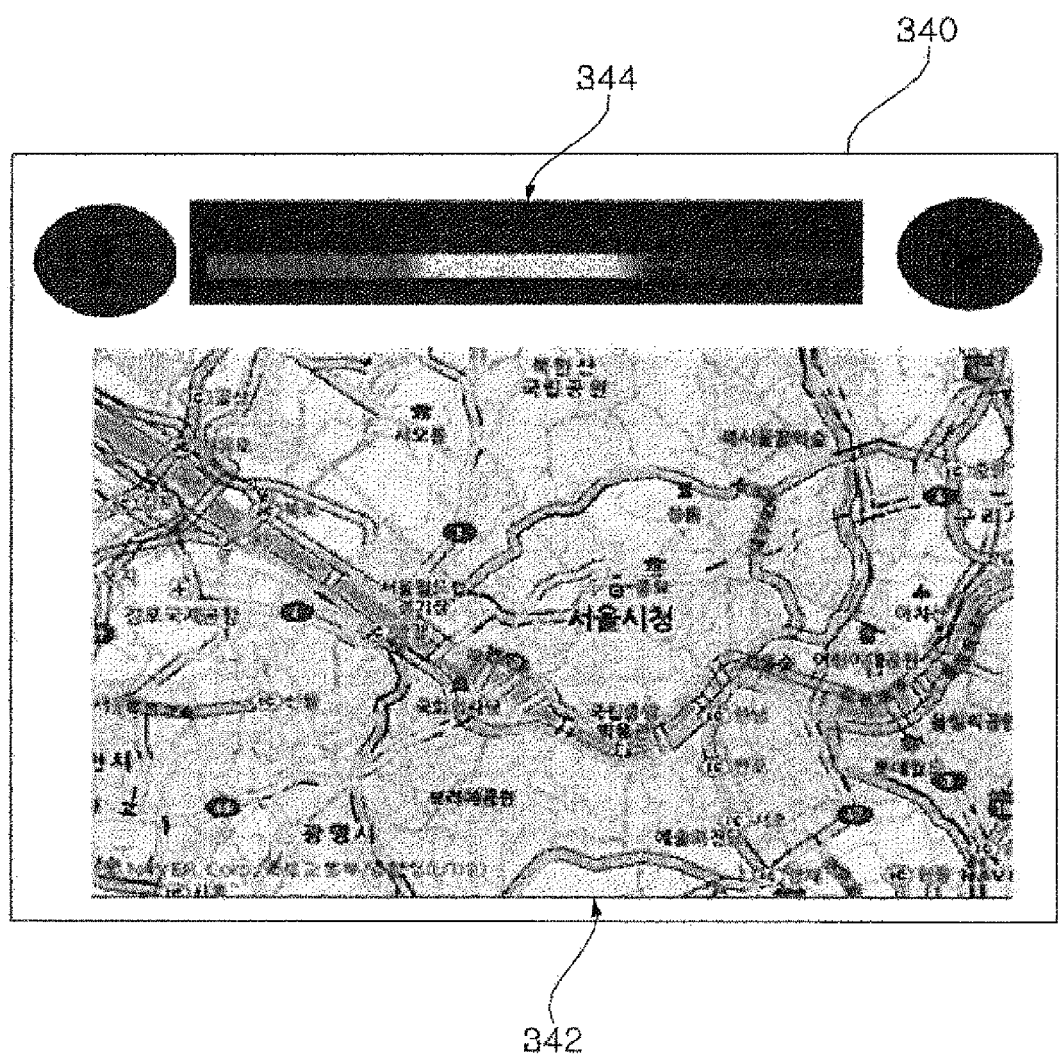
FIG. 3 is a diagram illustrating operation of a particulate matter information utilizing system according to an embodiment of the present invention.

Referring to FIG. 3, the control module 900 may transmit a particulate matter map signal, so that the mobile terminal 300 can output a particulate matter map on the display unit 340 of the electronic device (specifically, the mobile terminal 300) by matching map information with particulate matter concentration information and location information. Upon receiving the particulate matter map signal, the mobile terminal 300 outputs the particulate matter map through the display unit 340.

The control module 900 may output a control signal to display, on the display unit 340, particulate matter concentration information of each region with a text or color on a particulate matter map with which particulate matter concentration information is matched.

A particulate matter map window 342, and a comparison window 344 for comparing a color corresponding to a particulate matter concentration displayed on the particulate matter map window are activated on the display unit 340.

More specifically, the display unit 340 is controlled in a manner such that air quality is classified as one of five statuses "Good", "Normal", "Slightly Bad", "Bad", and "Very Bad" and the display unit 340 visually displays the five status in different colors.

In addition, the control module 900 may output a control signal to the display unit 340 to differentiate road regions and non-road regions in map information and display particulate matter concentration information of each of the road regions with a text or color.

Accordingly, a user is able to be aware of particulate matter information along with map information and thus easily recognize the particulate matter information based on the map information.

The above-described method for controlling various home appliances based on particulate matter concentration information and location information may be performed by the controller 310 of the mobile terminal 300 when the control module 900 is not included in the particulate matter measuring device 200.

Hereinafter, a structure of the particulate matter measuring device 200 will be described.

Figure 4:
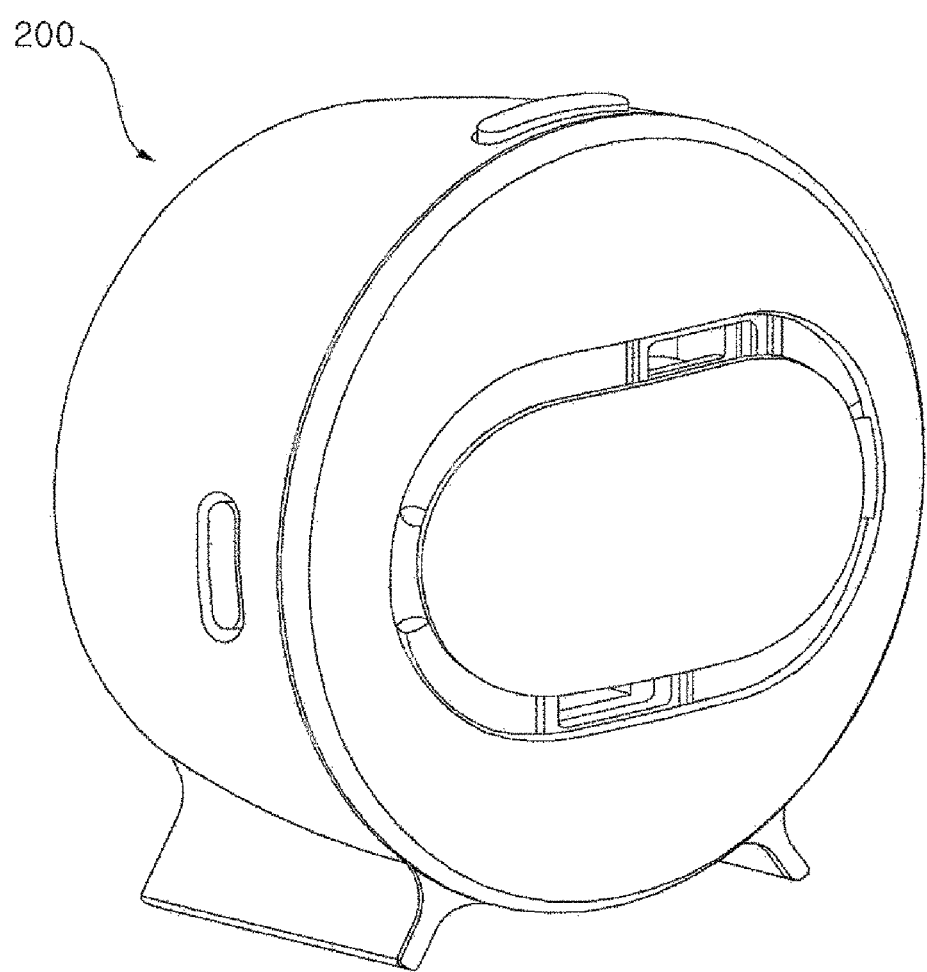
FIG. 4 is a perspective view of a particulate matter measuring device according to an embodiment of the present invention.
Figure 5:
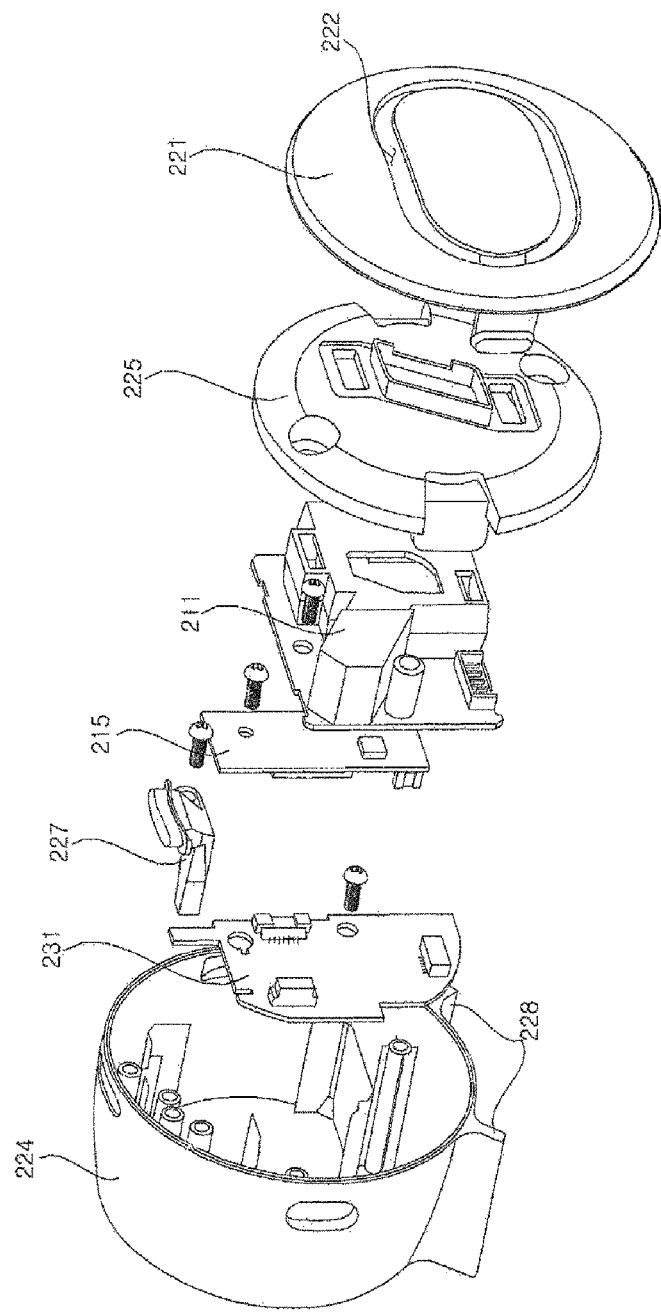
FIG. 5 is an exploded perspective view of the particulate matter measuring device shown in FIG. 4.

FIG. 4 is a perspective view illustrating the particulate matter measuring device 200 according to an embodiment of the present invention, and FIG. 5 is an exploded perspective view of the particulate matter measuring device 200 shown in FIG. 4.

Referring to FIGS. 4 and 5, the particulate matter measuring device 200 may include a housing, the particulate matter concentration measuring sensor 211, the location sensing module 213, and the communication module 215.

The housing has a space for accommodating the particulate matter concentration measuring sensor 211, the location sensing module 213, and the communication module 215. Specifically, the housing may include a lower housing 224, an upper housing 221, and a middle housing 225.

The lower housing 224 has an opening formed in one direction and an accommodating space inside. Specifically, the lower housing 224 has a cylindrical shape and an opening formed in an axial direction. A plurality of legs 228 is installed on a circumferential surface of the lower housing 224.

The upper housing 221 covers the opening of the lower housing 224. An air flow hole 222 through which outside air flows is formed in the upper housing 221.

The middle housing 225 is coupled to the lower housing 224 to restricts components accommodated in the lower housing 224.

The particulate matter measuring device 200 may further include a main board 231 to supply power. The location sensing module 213 may be embedded in the main board 231, and the communication module 215 and the particulate matter concentration measuring sensor 211 are installed thereon. Of course, an LED light 227 may be installed on the main board 231.

Figure 6:
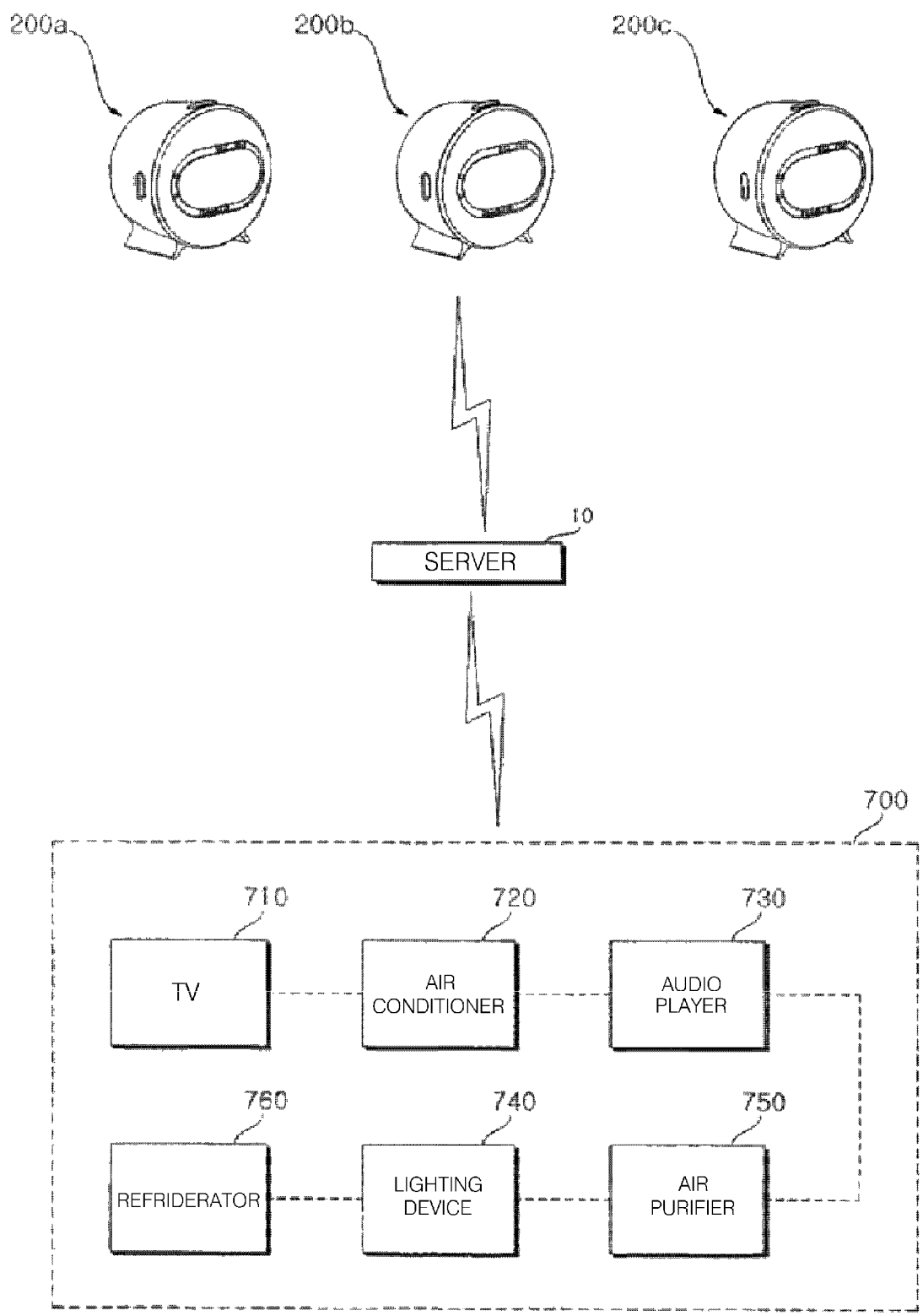
FIG. 6 is a block diagram of a particulate matter information utilizing system according to another embodiment of the present invention.

FIG. 6 is a block diagram of a particulate matter concentration information utilizing system according to another embodiment of the present invention.

Referring to FIG. 6, the embodiment of FIG. 6 is different from the embodiment of FIG. 1 in that the particulate matter measuring device 200 is provided in plural and the mobile terminal 300 is omitted.

Unless otherwise described, a configuration of the particulate matter measuring device 200 in the present embodiment is identical to that of the embodiment of FIG. 1.

A plurality of particulate matter measuring devices 200 is connected to the server 10 or an electronic device in a wireless communication method. Preferably, the plurality of particulate matter measuring device 200 is connected to the server 10 in a wireless communication method and particulate matter concentration information and location information collected by the plurality of particulate matter measuring device 200 may be stored in the server 10 and shared. The serer 10 may be connected to the plurality of electronic devices in a wireless communication method.

The control module 900 combines information provided from the plurality of particulate matter measuring devices 200 and is preferably disposed in the server 10 to easily control a plurality of electronic devices based on the combined information. However, aspects of the present invention are not limited thereto, control modules 900 may be disposed in the respective particulate matter measuring devices 200 and the control modules 900 of the respective particulate matter measuring devices may control the plurality of electronic devices in conjunction with each other.

The particulate matter information utilizing system according to another embodiment of the present invention may include the plurality of particulate matter measuring devices 200 for collecting particulate matter concentration information and location information corresponding to the particulate matter concentration information, and the control module 900 for outputting a control signal to control an electronic device based on the particulate matter concentration information and the location information which are measured by the plurality of particulate matter measuring devices 200.

Another embodiment of the present invention may identify a user's location based on location information provided from the respective particulate matter measuring devices 200, control electronic devices in consideration of a distance between a user and an indoor space 700, figure out a particulate matter exposure level of the user based on the particulate matter concentration information provided from the respective particulate matter measuring devices 200, and control the electronic devices in consideration of the particulate matter exposure level of the user.

Hereinafter, a structure of the air purifier 750 will be described as an example of the electronic devices.

Figure 7:
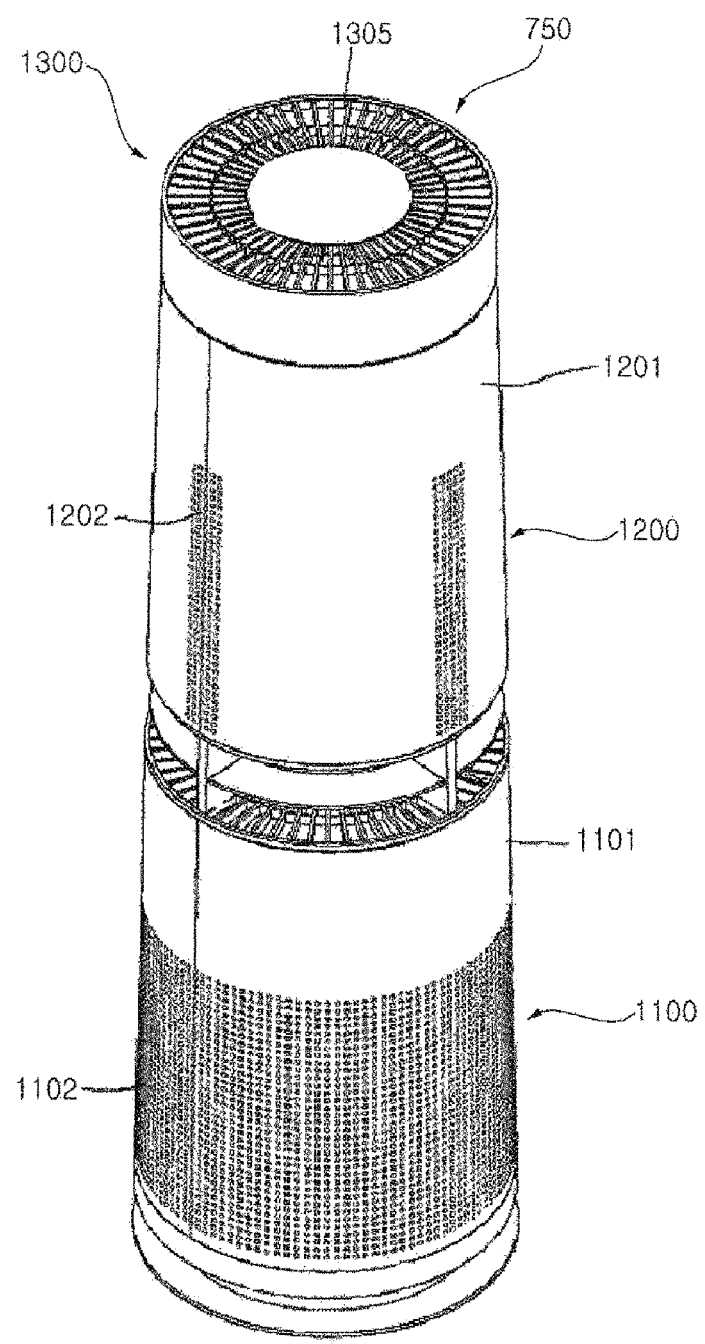
FIG. 7 is a perspective view of an air purifier according to an embodiment of the present invention.
Figure 8:
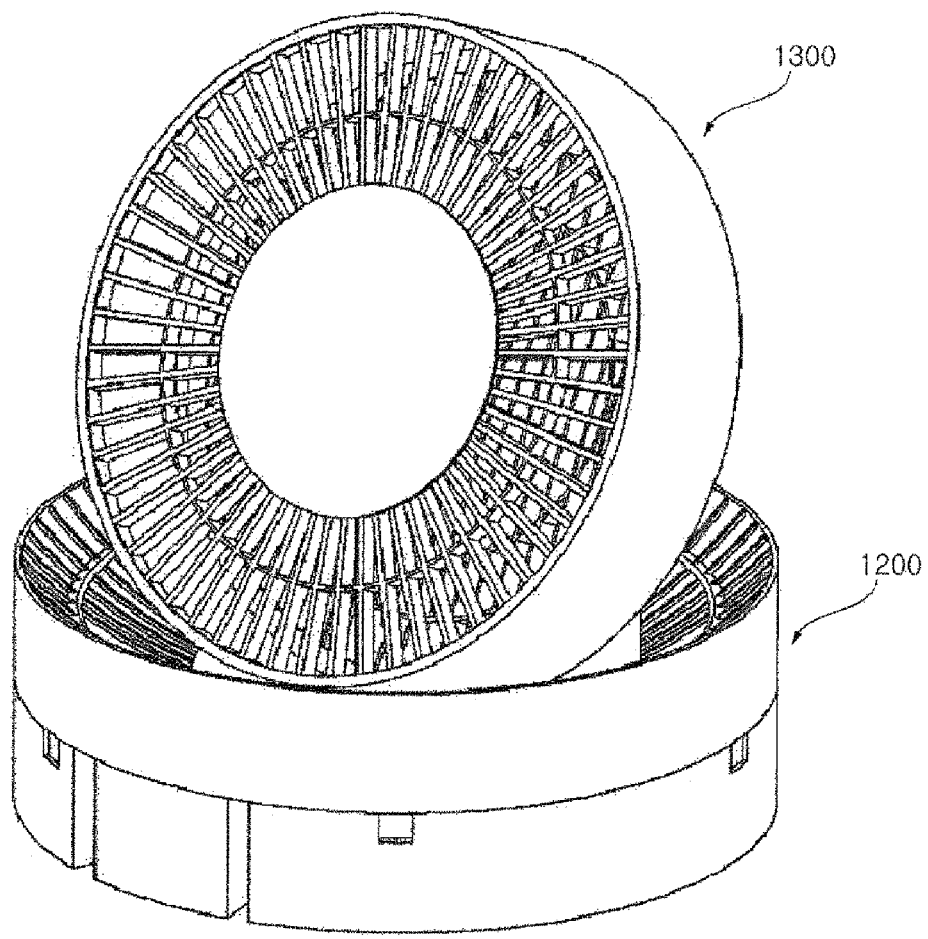
FIGS. 8 and 9 are diagrams illustrating operating states of the air purifier shown in FIG. 7.
Figure 9:
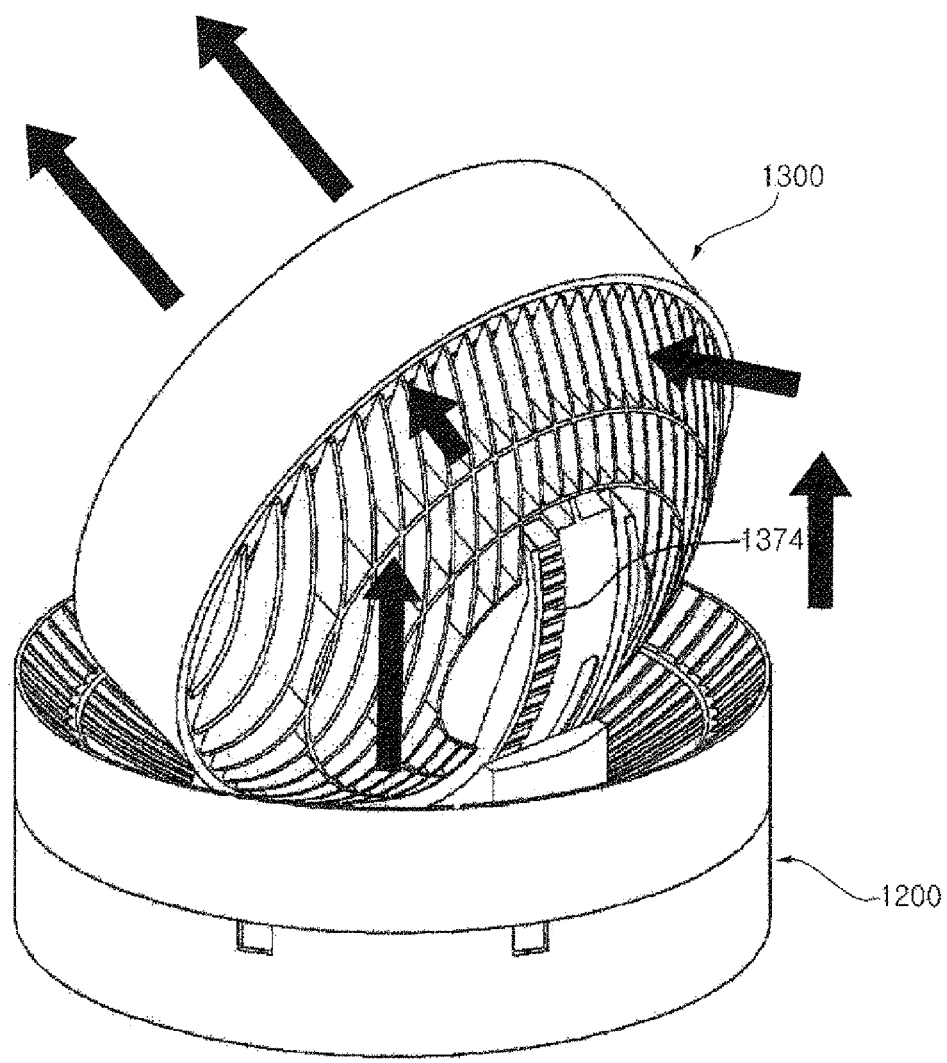

FIG. 7 is a perspective view of an air purifier 750 according to an embodiment of the present invention, and FIGS. 8 and 9 illustrate an operating state of the air purifier 750.

Referring to FIGS. 7, 8, and 9, the air purifier 750 includes a suction portion for suctioning air in a radial direction, a blowing device including a blowing fan (not shown) and a filter member, and an air flow control device 1300 movably disposed above the blowing device and having an air blowing adjusting fan 1305 for introducing air having passed the blowing fan.

The blowing device includes a blowing fan and a filter member for filtering air. The blowing device may include a first blowing device 1100 and a second blowing device 1200 disposed above the first blowing device 1100. The blowing device suctions air in a lower side, filters the air, and discharges the filtered air in an upper side.

The air purifier 750 includes a case forming an exterior appearance. The case includes a first case 1101 forming an exterior appearance of a first blowing device 1100, and a second case 1201 forming an exterior appearance of the second blowing device 1200.

The air flow control device 1300 moves from a first position for discharging air in an upward direction to a second position for discharging air in a forward-upward direction.

The air flow control device 1300 may be installed above the second blowing device 1200. An air flow path of the second blowing device 1200 may communicate with an air flow path of the air flow control device 1300. Air having passed through the second blowing device 1200 may pass through the air flow path of the air flow control device 1300 and be then discharged to the outside through a discharge portion.

The air flow control device 1300 may be movable.

Specifically, the air flow control device 300 may be movable between a laid-out state (first position), as illustrated in FIG. 7, or an inclined erected state (second position), as illustrated in FIGS. 8 and 9. In addition, a display device or display 600 that displays operation information of the air cleaner may be provided at an upper portion of the air flow control device. The display device 600 may be movable together with the air flow control device.

The air flow control device 1300 may include an air flow adjusting fan 1305 and an actuator for adjusting directions of the air flow adjusting fan 1305.

The actuator may include, for example, an inclined moving portion and a rotation means (not shown), wherein the inclined moving portion moves the air flow adjusting fan 1305 to be inclined in a direction in which a rotational axis of the air flow adjusting fan 1305 coincides with or intersects an upward-downward direction, and wherein the rotation means rotating the inclined moving portion about a central axis vertically passing through the center of the air purifier 750.

The inclined moving portion may include a rack 1374 coupled to the air flow adjusting fan 1305, and a motor (not shown) for supplying a rotational force to a gear (not shown) engaged with the rack 1374.

The air flow control device 1300 may provide clean water in the upward-downward direction at 360 degrees of the air purifier 750 by means of a combined movement of the actuator and the rotation means.

Hereinafter, a method for controlling the air purifier 750 based on particulate matter concentration information and location information will be described.

Figure 10:
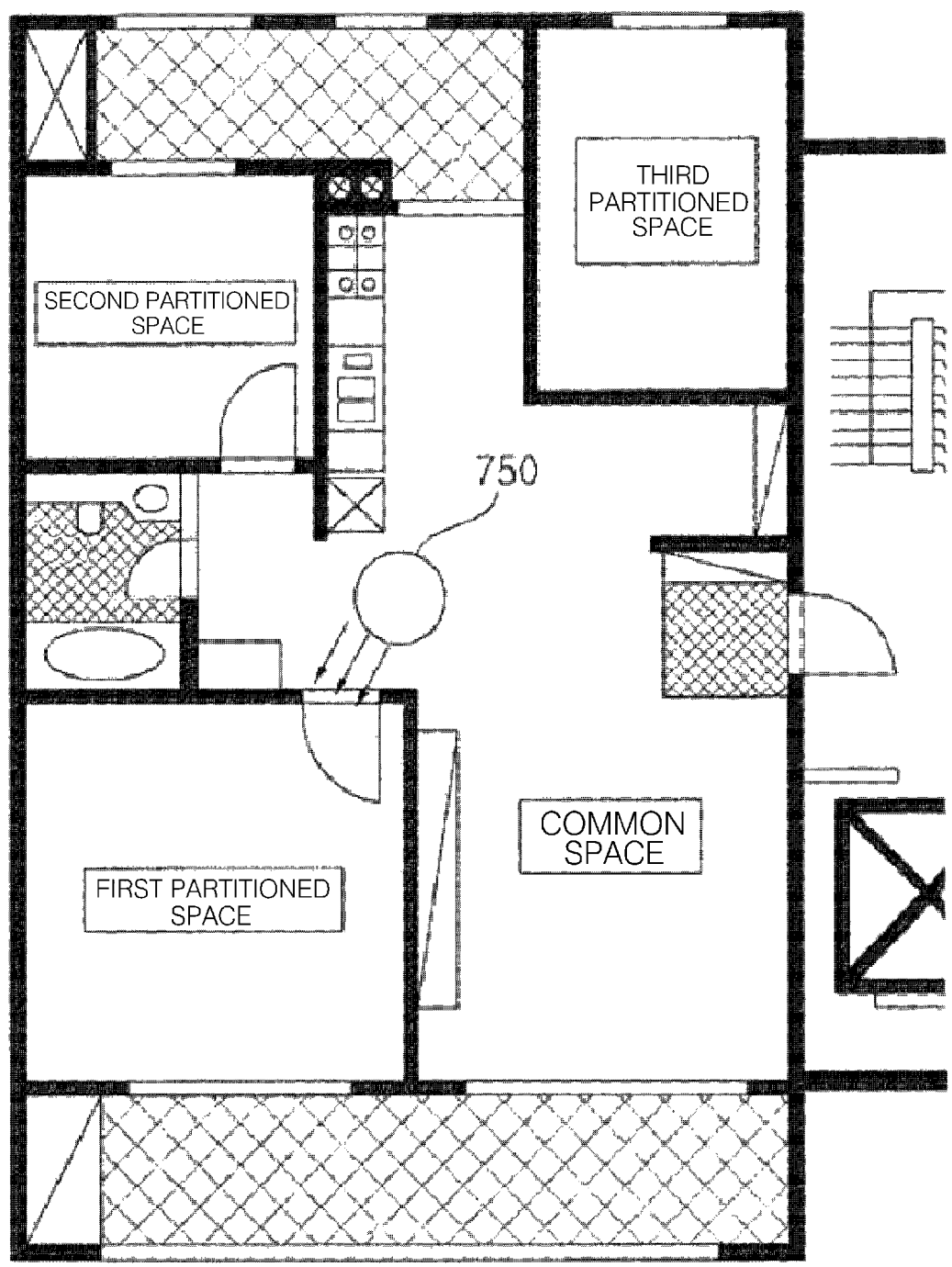
FIG. 10 is a diagram illustrating operation of a particulate matter information utilizing system according to another embodiment of the present invention.

FIG. 10 is a diagram illustrating operation of a particulate matter information utilizing system according to another embodiment of the present invention.

Referring to FIG. 10, according to the present invention, if a distance between an electronic device and at least one of a plurality of particulate matter measuring devices 200 is within a preset distance, the electronic device operates. For example, if a user is within a predetermined distance from the indoor space 700, an electronic device required to operate beforehand is subject to operation. Specifically, if the distance between an electronic device and at least one of the plurality of particulate matter measuring devices 200 is within the preset distance, at least one of the air purifier 750, a heater, or an air conditioner may operate.

More specifically, if a distance between the electronic device and at least one of the plurality of particulate matter measuring devices 200 is within the preset distance, the control module 900 transmits an operation mode signal to the electronic device to operate the electronic device. In response to receiving the operation mode signal, the electronic device starts to operate. In response to receiving the operation mode signal, the air purifier 750 purifies indoor air whilst the heater and the air conditioner adjust the indoor air to a set temperature.

In addition, if a distance between an electronic device and any one of the particulate matter measuring devices 200 exceeds the preset distance, the electronic device is controlled to operate in a sleep mode, thereby reducing energy consumption. Specifically, if a distance between an electronic device and any one of the particulate matter measuring devices 200 exceeds the preset distance, the control module 900 transmits a sleep mode signal to the electronic device to operate in the sleep mode.

In addition, in a case where a plurality of users use partitioned spaces of one indoor space 700 and a specific user is located indoor, the present invention may control an air discharge direction of the air purifier 750 to be directed toward a partitioned space in which the specific user stays most of the times.

Specifically, in a case where one particulate matter measuring device 200 is located in the indoor space 700, where an electronic device is located, and the other particulate matter measuring device 200 is located outside the indoor space 700, the control module 900 may transmit an air flow direction control signal to control an air discharge direction of the air purifier 750 to be directed toward a partitioned space corresponding to the particulate matter measuring device 200 located in the indoor space 700.

More specifically, orientations of the air purifier and the respective partitioned spaces, and information regarding the particulate matter measuring devices 200 corresponding to the respective partitioned spaces are stored in a memory or the like of the control module 900. Based on location information of a first particulate matter measuring device 200*a*, the control module 900 determines that a first user is located in the indoor space 700. Then, the control module 900 controls the air flow control device 1300 of the air purifier 750, so that air discharged from the air purifier 750 is controlled to flow in a direction toward a first partitioned space where the first user stays.

Accordingly, clean air may be provided to an area where a user stays in the indoor space 700, and thus, efficient air purification can be achieved.

In addition, in a case where one indoor space 700 is partitioned into a plurality of spaces to be used by a plurality of users and the plurality of users are located indoor, the present invention may control an air discharge direction of the air purifier 750 in consideration of particulate matter exposure levels of the respective users.

Specifically, in a case where the plurality of particulate matter measuring devices 200 is located in the indoor space 700 where an electronic device is located, the control module 900 may calculate average particulate matter concentration information of each of the particulate matter measuring devices 200 for a preset period of time, and transmit an air direction control signal to control an air discharge direction of the air purifier 750 to be directed toward one partitioned space corresponding to a particulate matter measuring device 200 having the highest average particulate matter concentration information.

More specifically, orientations of the air purifier and each partitioned space, and information on a particulate matter measuring device 200 corresponding to each partitioned space are stored in a memory or the like of the control module 900. The control module 900 may determine, based on location information of the first and second particulate matter measuring devices 200, that first and second users are located in the indoor space 700, and, when it is determined that an average particulate matter concentration of the first particulate matter measuring devices 200*a* is higher than an average particulate matter concentration of the second particulate matter measuring device 200*b*, the control module 900 controls the air flow control device 1300 of the air purifier 750 so that air discharged from the air purifier 750 flows toward a first partitioned space where the first user stays.

In another example, the control module 900 may calculate average particulate matter concentration information of each particulate matter measuring device 200 for a preset period of time and transmit a control signal, so that an air discharge direction of the air purifier 750 is maintained for a first period of time toward a partitioned space corresponding to a particulate matter measuring device 200 having relatively high average particulate matter concentration information and then the air discharge direction of the air purifier 750 is maintained for a second period of time toward another partitioned space corresponding to a particulate matter measuring device 200 having relatively low particulate matter concentration information, and the first period of time may be longer than the second period of time.

Specifically, the control module 900 may determines, based on location information of the first and second particulate matter measuring devices 200, that the first and second users are located in the indoor space 700, and, when it is determined that an average particulate matter concentration of the first particulate matter measuring devices 200*a* is higher than an average particulate matter concentration of the second particulate matter measuring device 200*b*, the control module may control the air purifier 750, so that the air discharge direction of the air purifier 750 is maintained toward a first partitioned space for 30 minutes and then the air discharge direction of the air purifier 750 is maintained toward a second partitioned space for 10 minutes.

Figure 11:
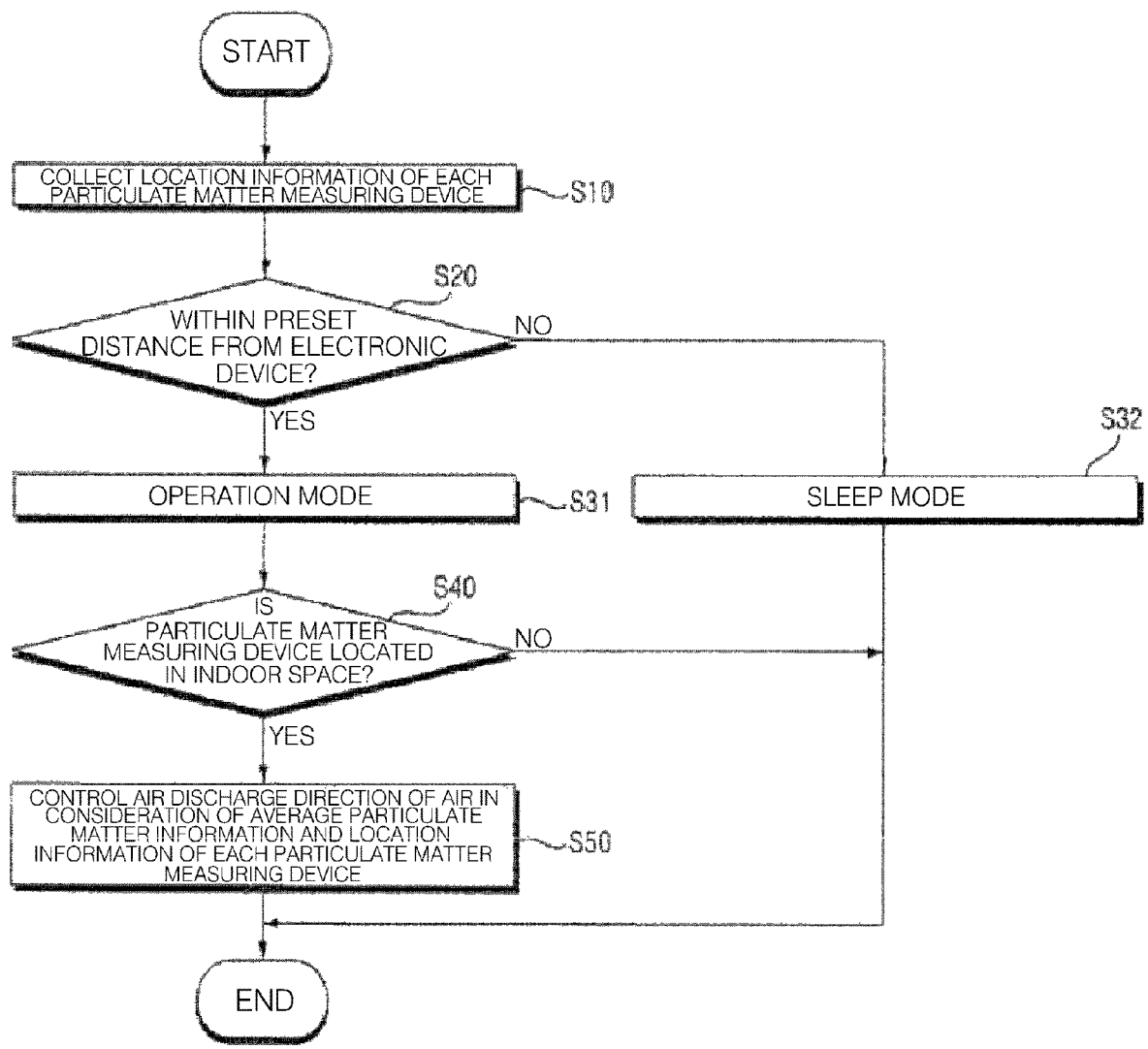
FIG. 11 is a flowchart illustrating a control method of a particulate matter information utilizing system device according to an embodiment of the present invention.

FIG. 11 is a flowchart illustrating a method for controlling a particulate matter information utilizing system according to an embodiment of the present invention.

Referring to FIG. 11, the method for controlling a particulate matter information utilizing system of the present invention is as below.

First, each of the plurality of particulate matter measuring devices 200 collects particulate matter concentration information and/or location information (S10).

It is determined as to whether a distance between an electronic device and one of the plurality of particulate matter measuring devices 200 is within a preset distance (S20). As described above, it is determined, based on location information of the plurality of particulate matter measuring devices 200 and location information of the electronic device, as to whether a distance between the electronic device and each of the plurality of particulate matter measuring devices is within the preset distance.

If the distance between the electronic device and one of the plurality of particulate matter measuring devices 200 is smaller than the preset distance, electronic devices connected to a corresponding particulate matter measuring device 200 are transitioned to an operation mode (S31). The operation mode of the electronic devices is the same as described above.

If the distance between the electronic device and one of the plurality of particulate matter measuring devices 200 is equal to or greater than the preset distance, electronic devices connect to a corresponding particulate matter measuring device 200 is transitioned to a sleep mode (S32). The operation mode of the electronic devices is the same as described above. The sleep modes of the electronic devices is a mode for minimum power consumption.

It is determined as to whether at least one of the plurality of particulate matter measuring devices 200 is located in the indoor space 700 (S40).

The electronic device is controlled in consideration of location information and average particulate matter information of each of the plurality of particulate matter measuring devices 200 (S50).

Figure 12:
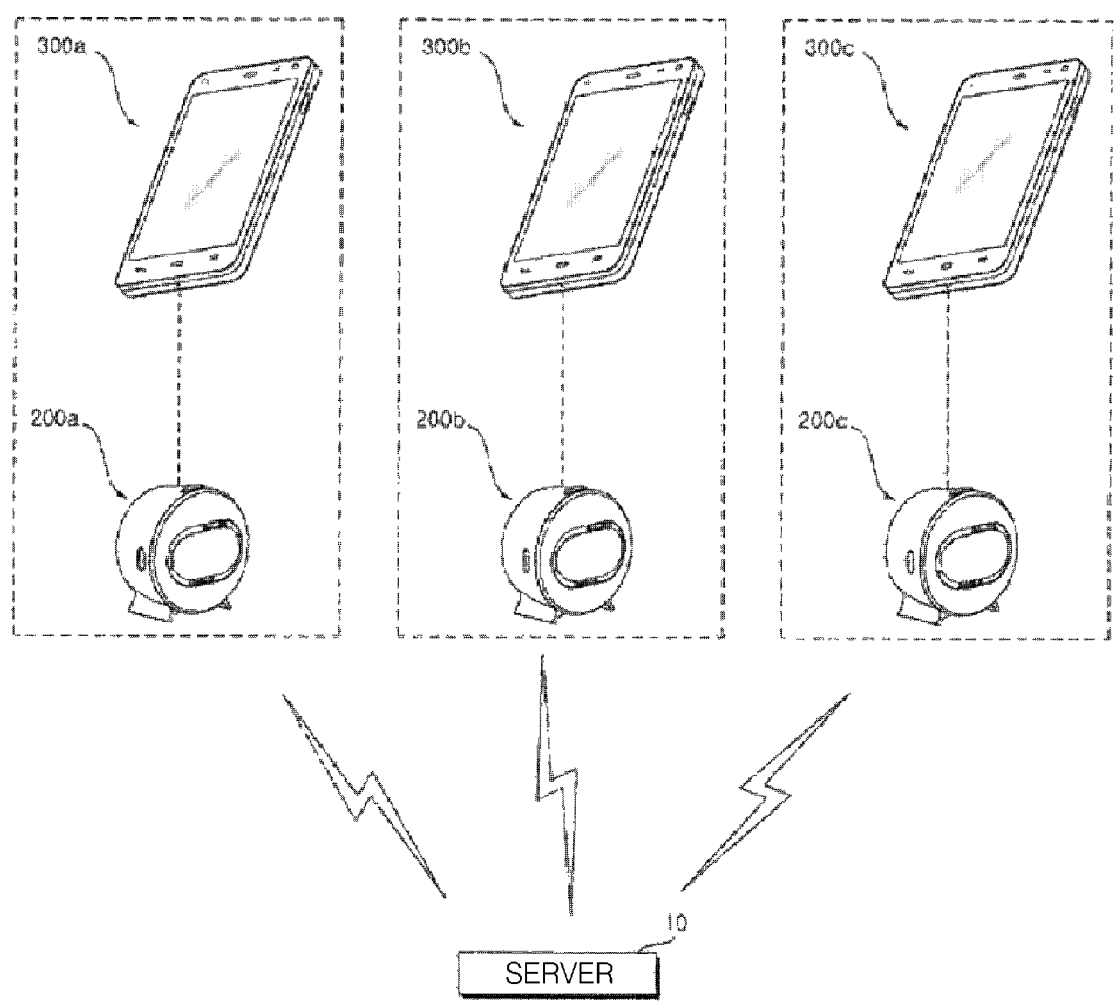
FIG. 12 is a conceptual diagram of a particulate matter information utilizing system according to yet another embodiment of the present invention.
Figure 13:
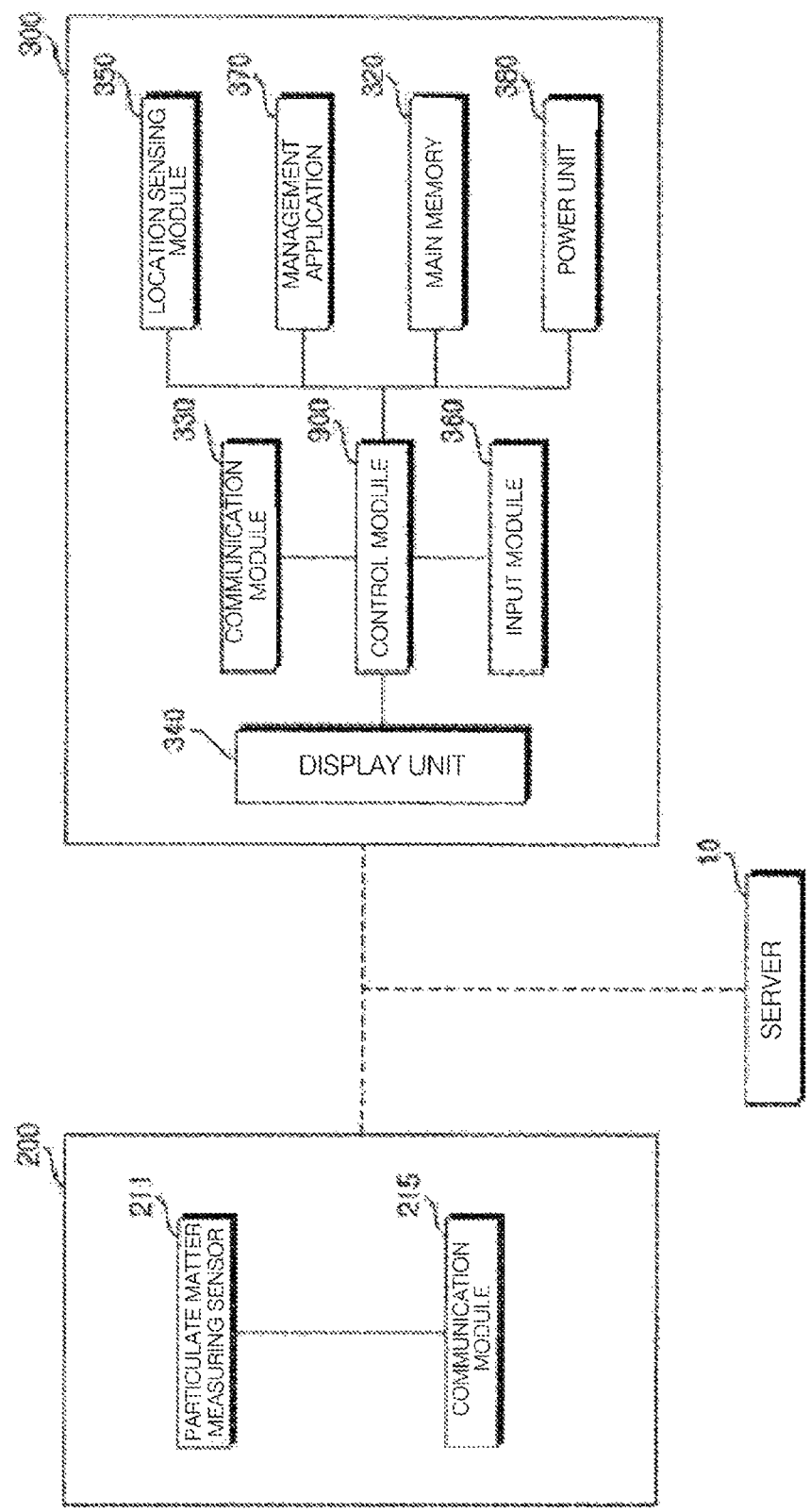
FIG. 13 is a block diagram of the particulate matter information utilizing system shown in FIG. 12.

FIG. 12 is a conceptual diagram of a particulate matter information utilizing system according to another embodiment of the present invention, and FIG. 13 is a block diagram of the particulate matter information utilizing system shown in FIG. 12.

Referring to FIGS. 12 and 13, the particulate matter information utilizing system according to another embodiment of the present invention is different from the embodiments of FIGS. 1 and 2 in that a particulate matter measuring device 200 is provided in plural, a mobile terminal 300 is provided in number corresponding to the number of particulate matter measuring devices 200, and any other electronic device is omitted except the mobile terminals 300.

Unless otherwise described, a particulate matter measuring device 200 and a mobile terminals 300 in the present embodiment have elements as the same as shown in the embodiment of FIG. 2.

Each particular matter measuring device 200 is paired with a corresponding mobile terminal 300 (specifically, a control module 900). Here, each particulate matter measuring device 200 is provided without a control module 900 and a location sensing module 213, and the corresponding mobile terminal 300 is provided without a controller 310 and instead with including a control module 900 and a location sensing module 213.

The control module 900 of the corresponding mobile terminal 300 serves as an integrated controller that is capable of performing functions of the control module 900 of a particulate matter measuring device 200 corresponding to the corresponding mobile terminal and capable of performing functions of the controller 310 of the mobile terminal 300 according to the embodiment shown in FIG. 1.

A location sensing module 213 of the corresponding mobile terminal 300 performs the same function of the location sensing module 213 of the particulate matter measuring device 200 shown in FIG. 1.

Thus, elements such as the control module 900, the memory, and the location sensing module 213, and the like can be omitted from the particulate matter measuring device 200 due to pairing between a mobile terminal 300 and a particulate matter measuring device 200, and therefore, the volume of the particulate matter measuring device 200 may be reduced.

Each mobile terminal 300 or each particulate matter collecting device are connected to the server 10 in a wired or wireless communication method. Thus, particulate matter information and location information collected by each particulate matter collecting device may be shared with a different user.

In the present embodiment, a particulate matter map may be output on a display unit 340 of a mobile terminal 300, based on a plurality of items of particulate matter concentration information and a plurality of items of location information collected by the plurality of particulate matter measuring devices 200.

Specifically, the control module 900 may transmit a particulate matter map signal so that the mobile terminal 300 outputs a particulate matter map on the display unit 340 of the mobile terminal 300 by matching map information with the particulate matter concentration information and the location information collected by the plurality of particulate matter measuring devices 200

In addition, the control module 900 may transmit a particulate matter map signal at intervals of a preset unit time based on particulate matter concentration information and location information which are collected at intervals of the preset unit time. Thus, the mobile terminal 300 may provide a user with a particulate matter map that is updated each unit time.

The mobile terminal 300 may serve as a moving object. In a case when the mobile terminal 300 moves, the mobile terminal 300 may provide various routes to a user based on particulate matter concentration information, location information, and traffic information.

At this point, the location sensing module 213 may sense a location of the mobile terminal 300 serving as a moving object, and the display unit 340 may perform guidance for a route.

The control module 900 may set a route to a designated destination, and perform control to output the set route through the display unit 340.

The present embodiment receives a plurality of items of particulate matter concentration information and a plurality of items of location information are received to provide a user with a route in which a particulate matter concentration to the user's destination is taken into consideration and a route in which traffic information is taken into consideration.

Figure 14:
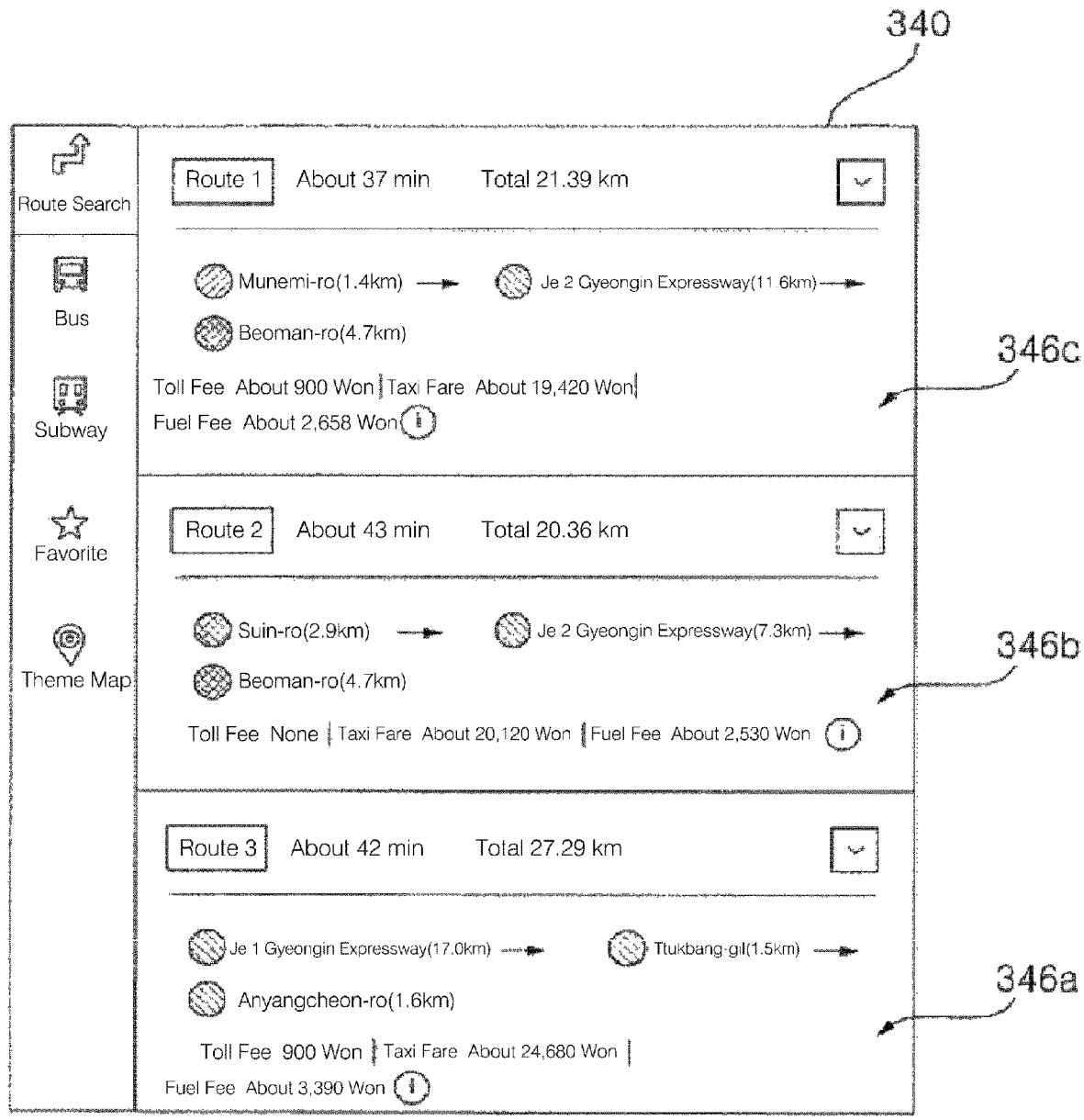
FIGS. 14 and 15 are diagrams illustrating operation of the particulate matter information utilizing system according to yet another embodiment of the present invention.

Referring to FIG. 14, the control module 900 may set a route by receiving a plurality of items of particulate matter concentration information and a plurality of items of location information. Specifically, the control module 900 may set a clean air route passing through an area with relatively low particulate matter concentration information to a designated destination, may set a shortest route having the shortest distance to the designated destination, or may set a quickest route requiring a shortest time to the designated destination based on traffic information. In addition, the control module 900 may set a clean air route passing through an area having relatively low particulate matter concentration information to a designated destination, a shortest route having the shortest distance to the designated destination, and a quickest route requiring a shortest time to the designated destination based on traffic information. Of course, the display unit 340 may output at least one of the clean air route, the shortest route, or the quickest route, and perform guidance for each output route.

The present embodiment, may inform a user of various routes and perform guidance for a route selected by the user from among the various routes.

Specifically, the control module 900 may transmit a control signal to the display unit 340 to activate selection windows 346a, 346b, and 346c through which the user can select any one of the clean air route, the shortest route, and the quickest route. The display unit 340 activates the selection windows 346a, 346b, and 346c in accordance with the control signal from the control module 900, and, when the user inputs a selection command through the user input unit 360, the display unit performs guidance for any one of the clean air route, the shortest route, and the quickest route according to the user's selection.

More specifically, the control module 900 may transmit a control signal to the display unit 340 to activate selection windows including the clean air route and the shortest route so that a user is allowed to select any one of the clean air route and the shortest route, or to activate selection windows, or may transmit a control signal to the display unit to activate selection windows including the clean air route and the quickest route so that the user is allowed to select any one of the clean air route and the quickest route.

In addition, the present embodiment divides each route into a plurality of areas and display, on the display unit 340, particulate matter concentration information of each area in a visually recognizable text or color.

Figure 15:
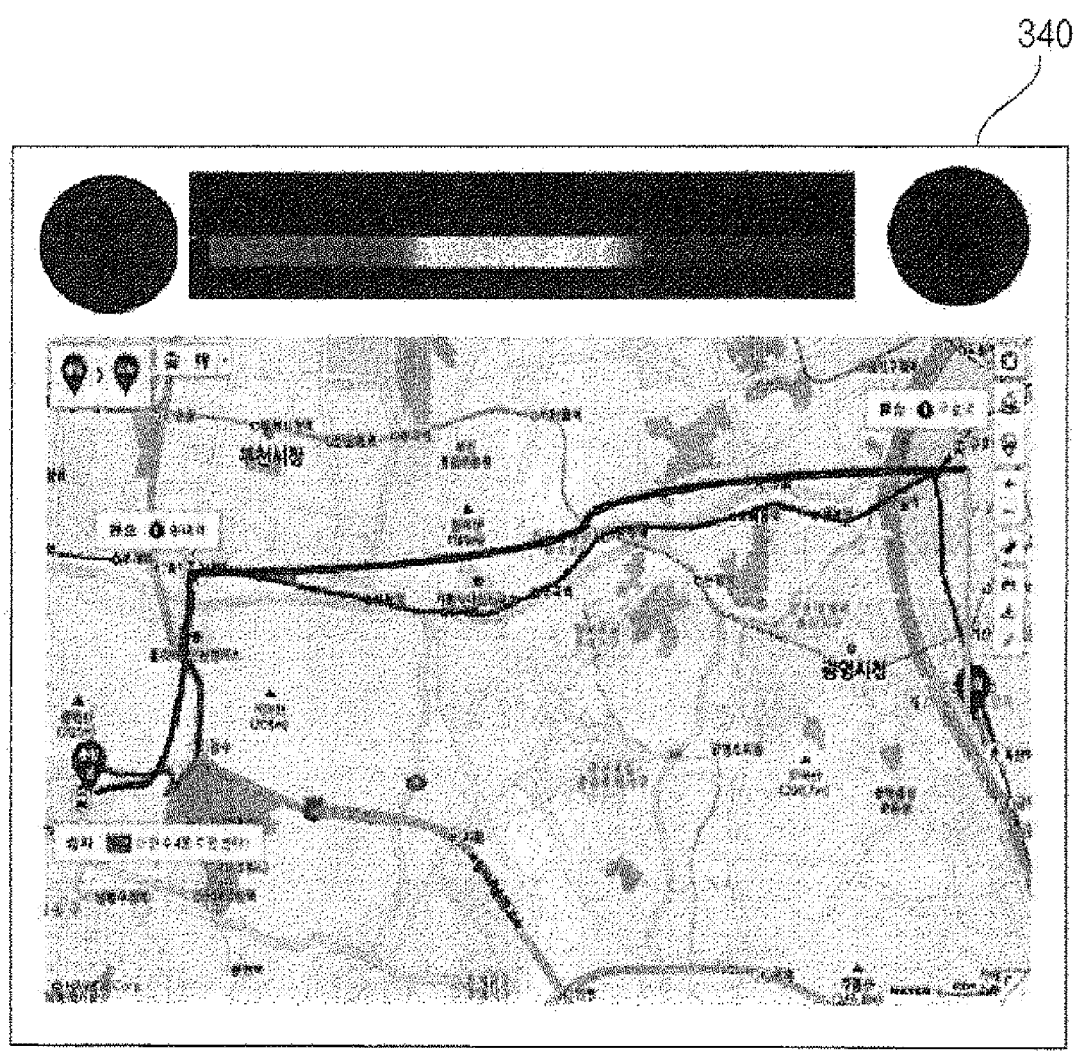

Referring to FIG. 15, specifically, the control module 900 may transmit a control signal to the display unit 340, so that particulate matter concentration information on a route is displayed in a text or color. In addition, based on information on a previous route along which a moving object actually moved, the control module 900 may output a control signal to the display unit 340, so that particulate matter concentration information on the previous route is displayed in a text or color. Of course, the control module 900 may divide each of the above-described route and the previous route into a plurality of areas and output a control signal so that particulate matter concentration information of each area is displayed in a text or color.

While exemplary embodiments have been described with respect to the present disclosure, the above exemplary embodiments are merely examples and the present invention is not limited thereto and it will be apparent to those skilled in the art that various modifications and applications can be made to the above-described exemplary embodiments of the present disclosure without departing from the spirit or scope of the disclosure. For example, elements of the exemplary embodiments described herein may be modified. Also, it should be construed that differences related to such modifications and applications are included in the scope of the present invention defined in the appended claims.

The invention claimed is:

1. A particulate matter information utilizing system comprising:
   a location sensor configured to sense a location of a moving object;
   a control module configured to set a route to a designated destination; and
   a display configured to display guidance information including the route,
   wherein the control module is configured to set the route based on receiving, from a plurality of particulate matter measuring devices configured to collect particulate matter concentration information and location information corresponding to the particulate matter concentration information, a plurality of items of the particulate matter concentration information and a plurality of items of the location information, and
   wherein the control module is further configured to:
      determine a clean air route from the location of the moving object to the designated destination, the clean air route passing through an area having a particulate matter concentration that is included in the particulate matter concentration information and that is lower than a particulate matter concentration of another area,
      determine a shortest route having a shortest distance from the location of the moving object to the designated destination,
      control the display to display graphical representations including the clean air route and the shortest route, respectively, to allow a user to select one of the clean air route or the shortest route,
      based on receiving traffic information, determine a quickest route that is estimated to take a shortest time to the designated destination, and
      control the display to display the graphical representation including the clean air route and a graphical representation including the quickest route to allow the user to select one of the clean air route or the quickest route.

2. The system of claim 1, further comprising a server configured to store the plurality of items of the particulate matter concentration information and the plurality of items of the location information provided by the plurality of particulate matter measuring devices.

3. The system of claim 1, further comprising:
   a particulate matter measuring device paired with the control module and configured to measure the particulate matter concentration information; and
   a mobile terminal comprising the location sensor, the display, and the control module.

4. The system of claim 1, wherein the control module is configured to output a control signal to the display to display the particulate matter concentration information corresponding to the route in a text or color.

5. The system of claim 1, wherein the control module is configured to, based on information on a previous route along which the moving object actually moved, output a control signal to the display to display the particulate matter concentration information corresponding to the previous route in a text or color.

6. The system of claim 1, wherein the control module and the location sensor are disposed at the moving object, and the location of the moving object is determined based on a location of the location sensor.

7. The system of claim 1, wherein the control module is configured to set the route based on the user selecting one of the clean air route or the shortest route.

8. The system of claim 1, wherein each of the graphical representations is a selection window configured to receive selection input from the user.

9. The system of claim 1, wherein the control module is configured to control the display to display map information including a plurality of routes from the location of the moving object to the designated destination and the particulate matter concentration information corresponding to each of the plurality of routes.

10. The system of claim 9, wherein the control module is configured to control the display to display the plurality of routes in a plurality of colors according to the particulate matter concentration information corresponding to each of the plurality of routes.

11. The system of claim 1, wherein the control module is configured to control the display to display, in a single screen, all of the graphical representation including the clean air route, the graphical representation including the shortest route, and the graphical representation including the quickest route to allow the user to select one of the clean air route, the shortest route, or the quickest route from the single screen.

12. The system of claim 1, wherein the control module is configured to, based on the user selecting the clean air route, control the display to display guide information corresponding to the clean air route.

13. The system of claim 1, wherein the control module is configured to, based on the user selecting the shortest route, control the display to display guide information corresponding to the shortest route.

14. The system of claim 1, wherein the control module is configured to, based on the user selecting the quickest route, control the display to display guide information corresponding to the quickest route.

* * * * *